C. H. OCUMPAUGH.
VOTING MACHINE.
APPLICATION FILED FEB. 20, 1896.
1,013,679.
Patented Jan. 2, 1912.
9 SHEETS—SHEET 3.
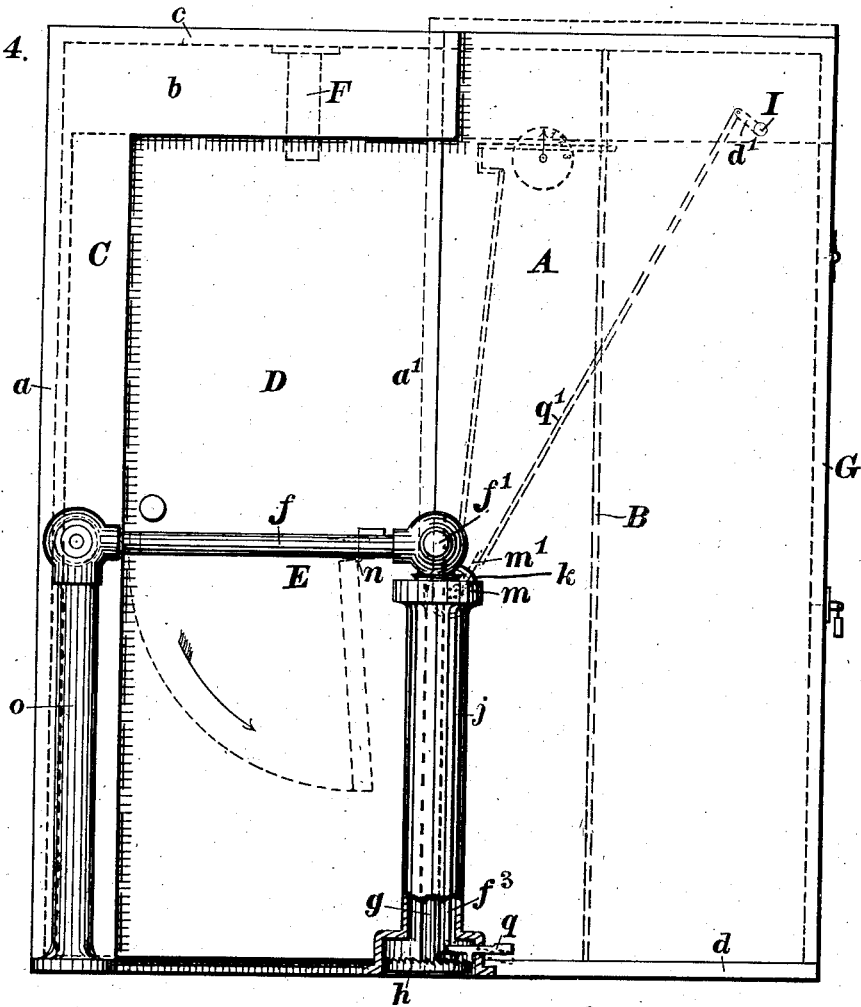
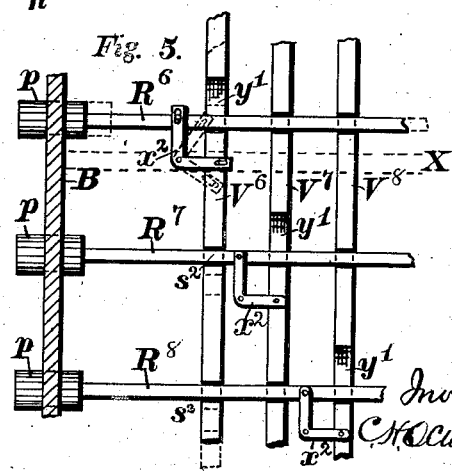
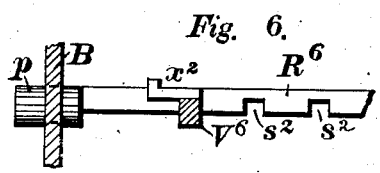
Witnesses:
R. F. Osgood.
C. G. Crannell
Inventor:
C. H. Ocumpaugh C. H. OCUMPAUGH.
VOTING MACHINE.
APPLICATION FILED FEB. 20, 1896.
1,013,679.
Patented Jan. 2, 1912.
9 SHEETS—SHEET 4.
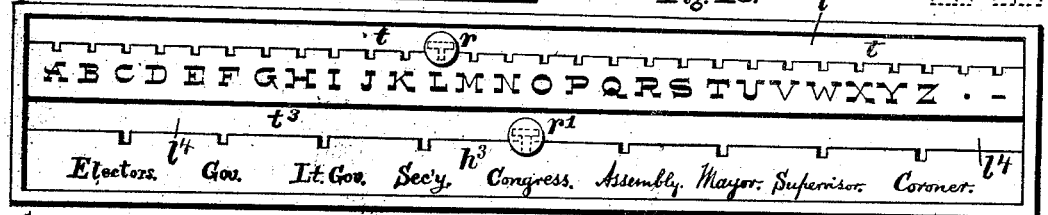

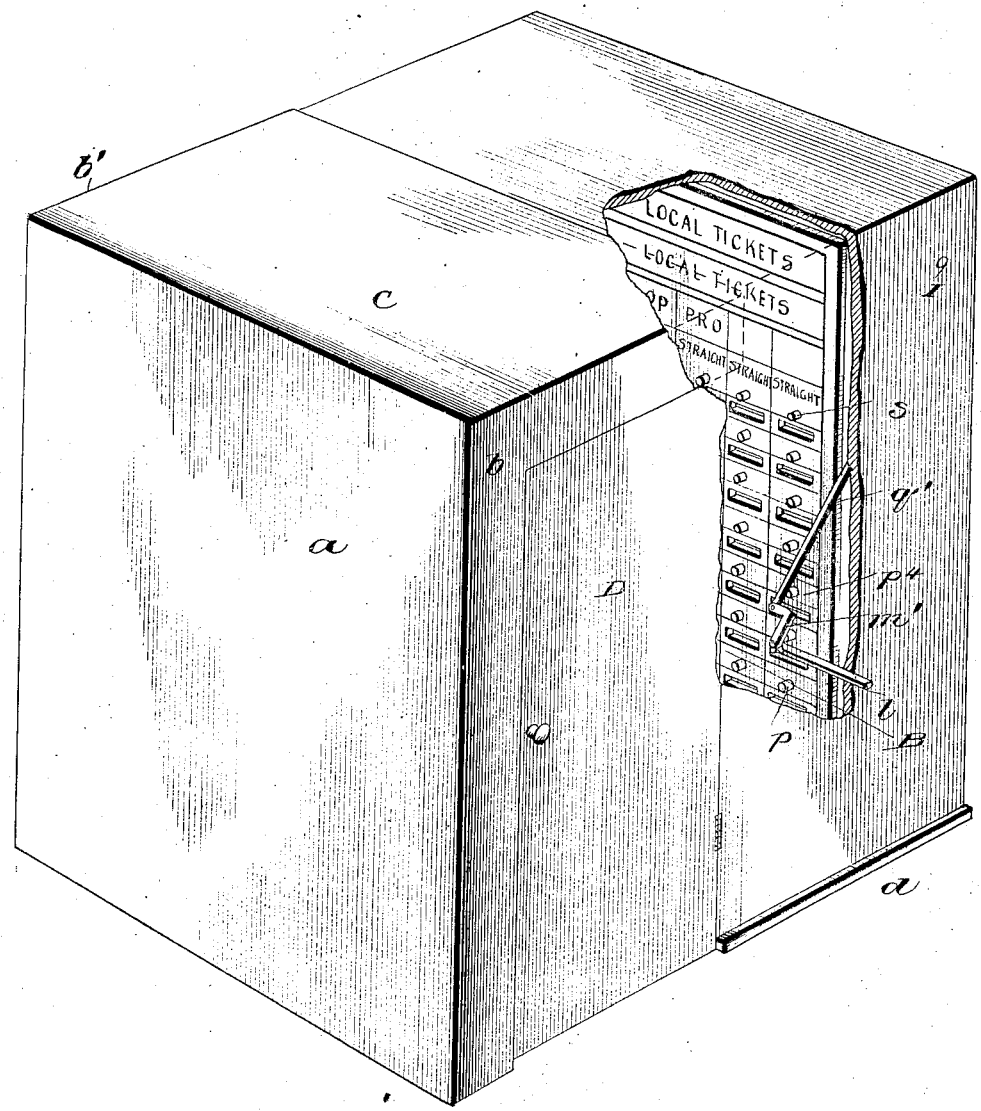

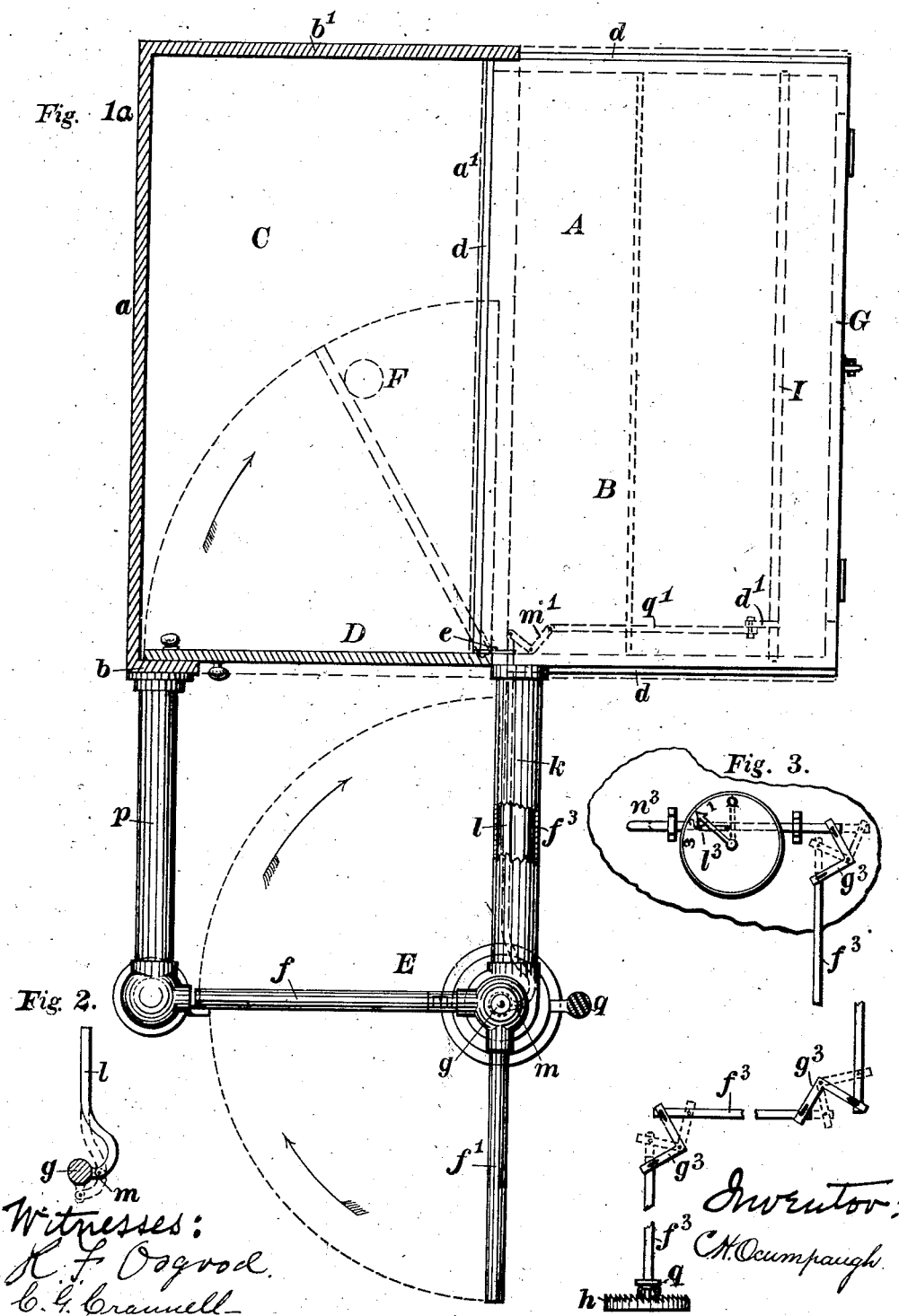

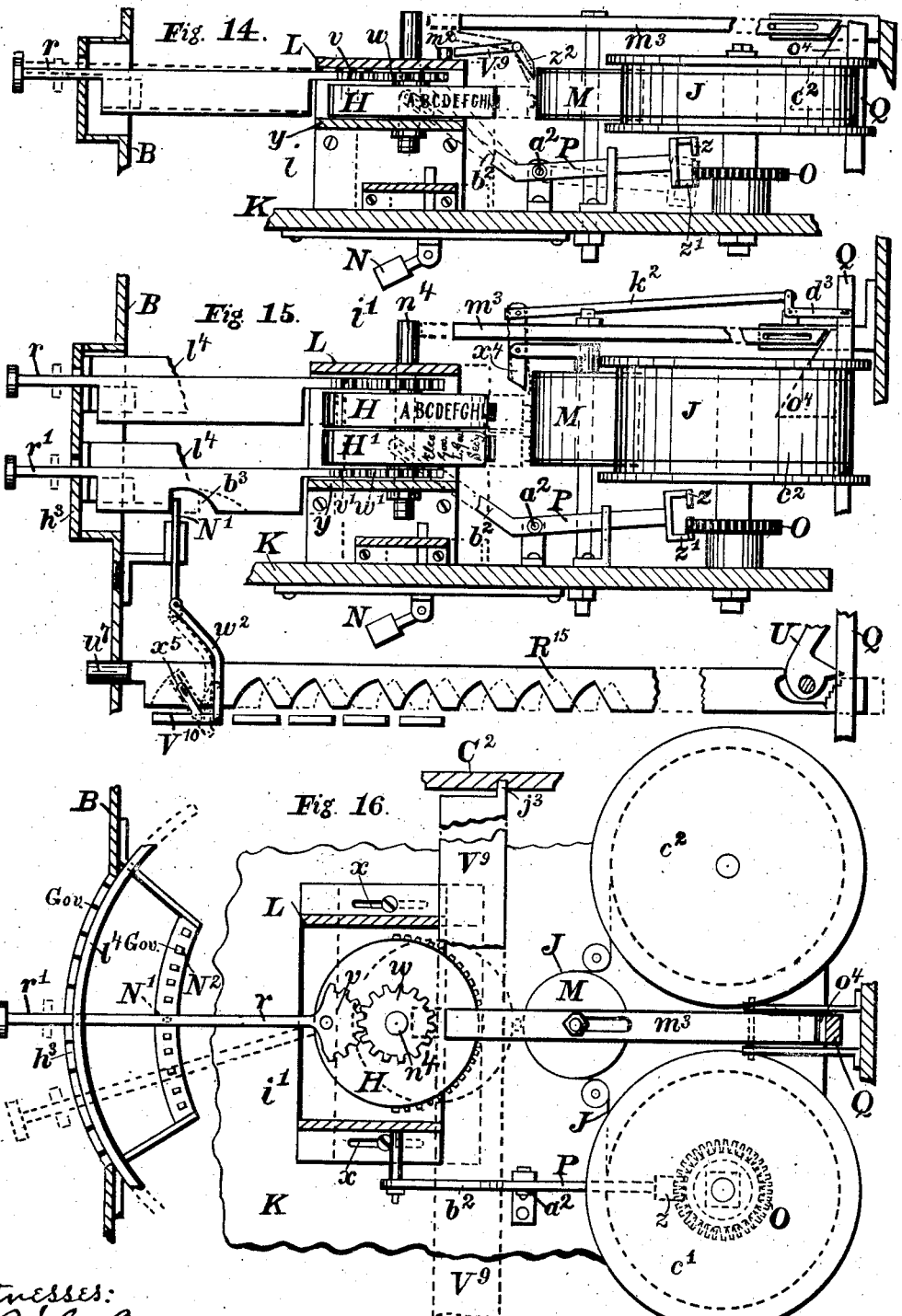

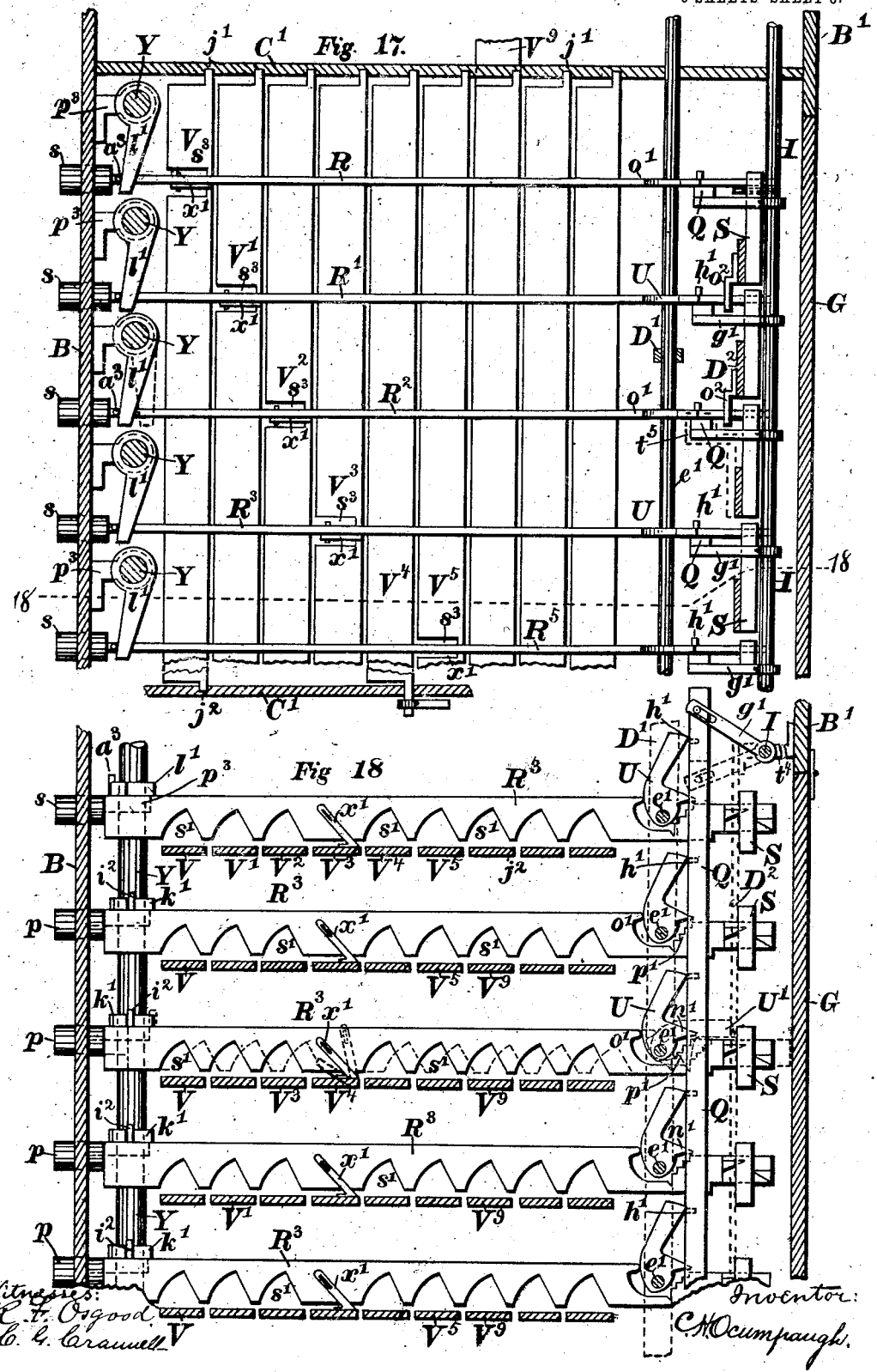

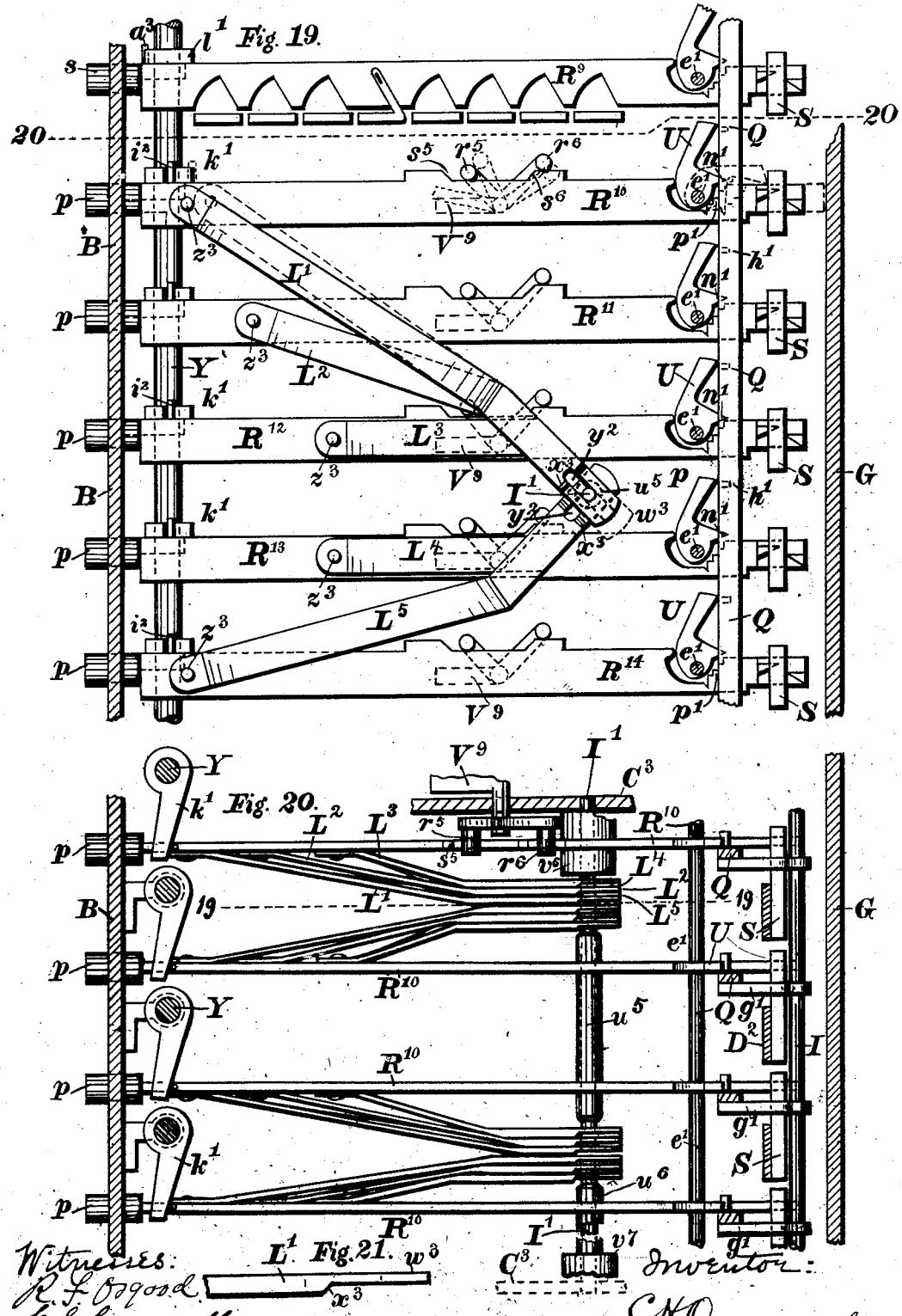

C. H. OCUMPAUGH.
VOTING MACHINE.
APPLICATION FILED FEB. 20, 1896.
1,013,679.
Patented Jan. 2, 1912.
9 SHEETS—SHEET 8.
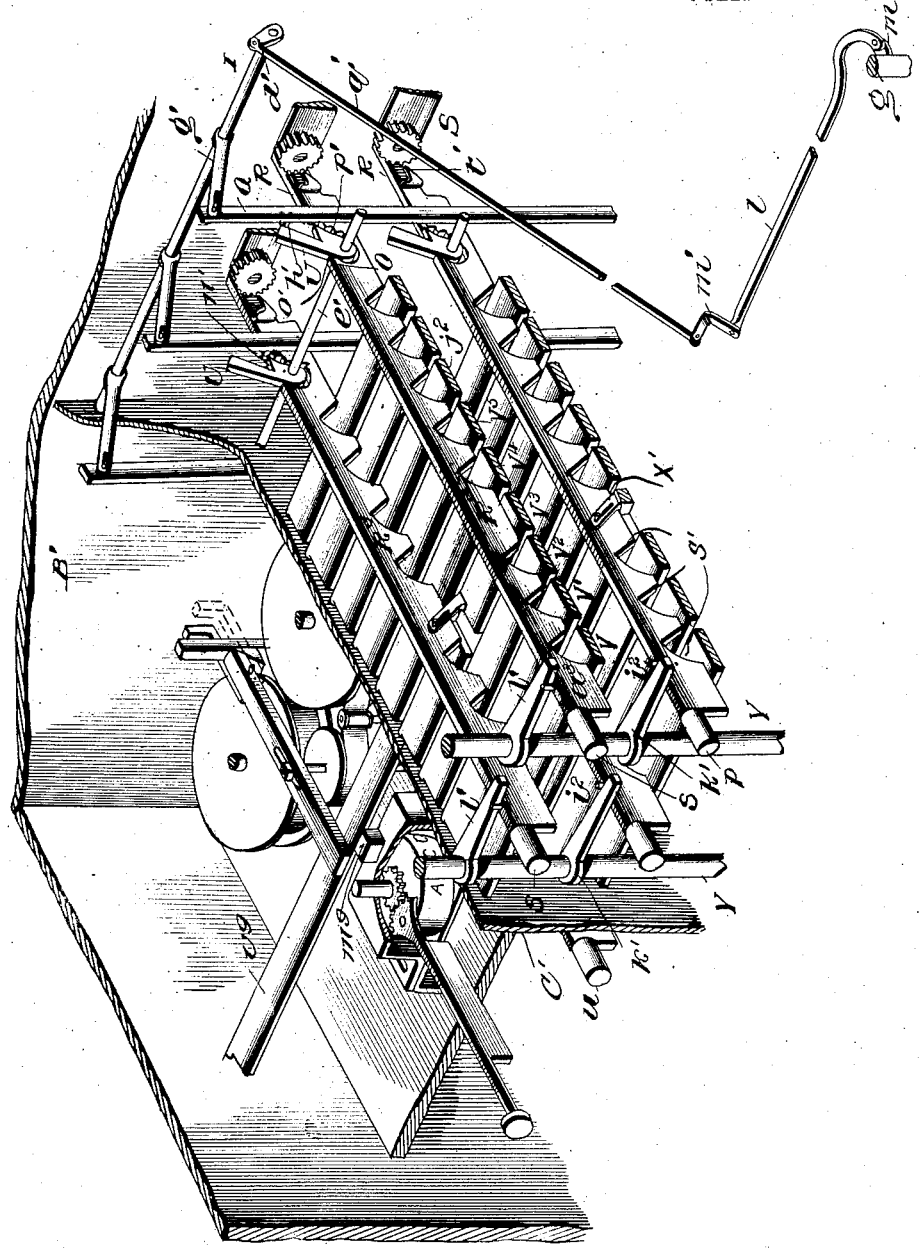
Witnesses
Jno. Munie
D. W. Gould
Inventor
Chas. H. Ocumpaugh,
by Benj. R. Catlin
Attorney

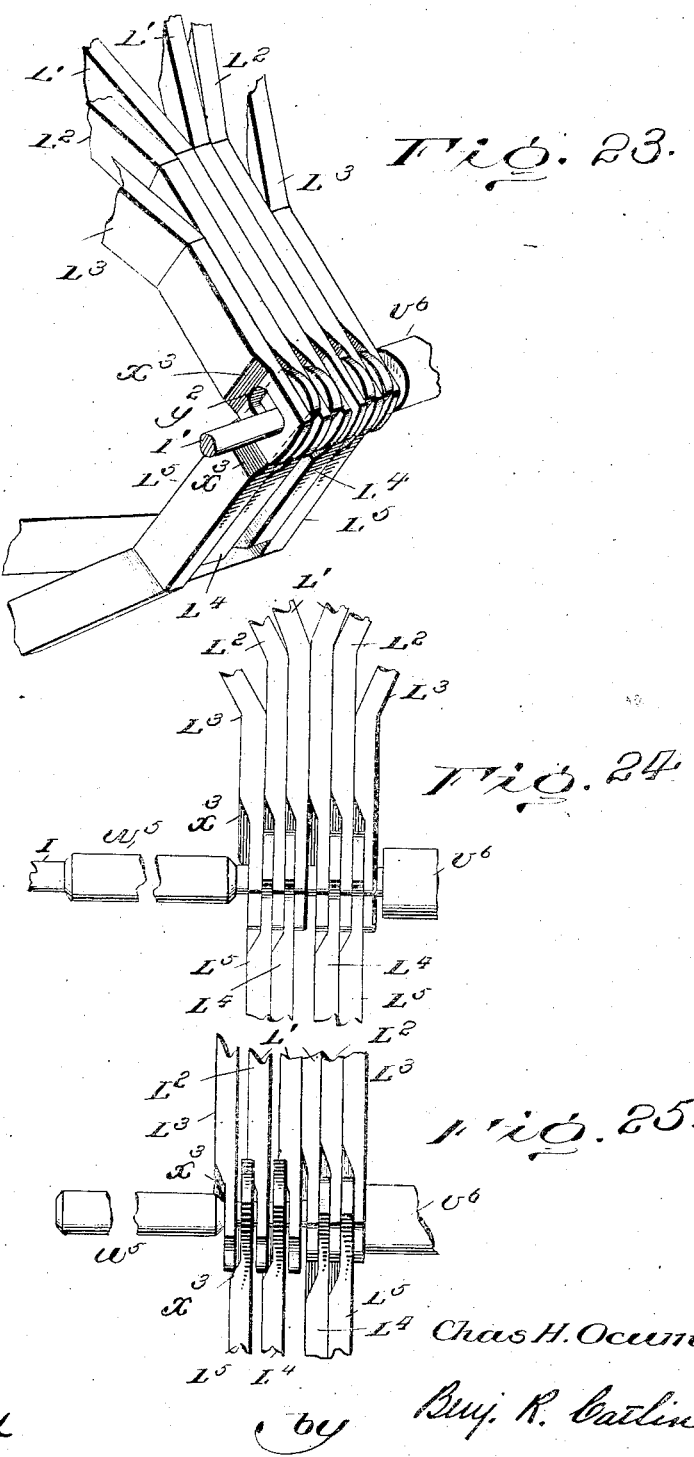

UNITED STATES PATENT OFFICE.

CHARLES HERBERT OCUMPAUGH, OF ROCHESTER, NEW YORK.

VOTING-MACHINE.

1,013,679.  Specification of Letters Patent.  Patented Jan. 2, 1912.

Application filed February 20, 1896. Serial No. 580,017.

*To all whom it may concern:*

Be it known that I, CHARLES HERBERT OCUMPAUGH, a citizen of the United States, residing at Rochester, in the county of Monroe, in the State of New York, have invented certain Improvements in Voting-Machines, of which the following is a specification, reference being had to the accompanying drawings.

My invention relates to certain improvements in the construction and operation of voting machines, which improvements are fully described and illustrated in the following specification and the accompanying drawings,—the novel features thereof being specified in the claims annexed to the said specification.

In the accompanying drawings, representing my improvements in voting machines; Figure 1 is a perspective view of the booth and voting chamber, the former being broken out to show the voting mechanism. Fig. 1ª is a plan view of the booth and turnstile, the collapsible voting compartment being shown in section, and as collapsed on the booth in dotted lines. Fig. 2 represents the crank on the shaft of the turnstile. Fig. 3 represents the clock mechanism as seen from the inside of the voting compartment. Fig. 4 is a side elevation of the machine. Figs. 5 and 6 represent a modified form of the interlocking devices between the push-bars. Fig. 7 is a front view of the key-plate, showing the arrangement of the pushes and the irregular voting devices,—and the separation of the pushes into groups for Federal and State, and county and local candidates. Fig. 8 represents the arrangement of the pushes when a single irregular-voting device is used for all the offices. Fig. 9 is a rear view of one of the counters. Fig. 10 is a front view of the counter-disks. Fig. 11 is a sectional view of the counter. Fig. 12 represents the inclined pallets which actuate the units-wheel. Fig. 13 is a front view of the irregular voting mechanism. Fig. 14 is a side elevation of the same. Fig. 15 is a side elevation of a modified form of the same. Fig. 16 is a plan view of the same. Fig. 17 is a plan view of the selective voting mechanism, showing the keys or pushes and sliding bars, the counters, the interlocking and restoring mechanisms, and the straight-ticket device. Fig. 18 is a side elevation of the same. Fig. 19 is a side elevation of the interlocking mechanism in the multicandidate group, showing the parts above the line 19—19, Fig. 20. Fig. 20 is a plan view of the mechanism of the multicandidate group, showing the arrangement for four vertical rows of pushes. Fig. 21 represents the inner end of one of the interlocking rods. Fig. 22 is a broken perspective of the voting mechanism, showing the means for locking the same and also the means for returning the voting mechanism to normal position. Fig. 23 is a partial perspective, illustrating the locking mechanism for the multicandidate group; and Figs. 24 and 25 are partial elevations of the same.

My improvements in voting machines comprise a booth A, of suitable dimensions, containing the key-plate B, which supports the keys, the counting, interlocking and other requisite mechanisms, and the collapsible voting compartment C, provided with the door D, protected by the turnstile E. The voting compartment is constructed so that,—the turnstile and its connections having been removed,—it can be collapsed on the booth, as clearly shown in Figs. 1, 1ª and 4, whereby the bulk of the apparatus can be materially reduced for purposes of storage or shipment. For this purpose the voting compartment is constructed of the side-wall $a$, the ends $b$ $b^1$, and a suitable roof $c$, (omitted in Fig. 1ª) but without floor, and open on the side next the booth, which is also open, so that, by raising it slightly, the roof can slide over the top of the booth, and the ends can move along the ends of the booth, until the booth is entirely covered by the voting compartment,—in which position it may be secured by any suitable catches, hooks, or other devices. The side-wall $a$ of the voting-compartment then rests at $a^1$ against the edges of the end walls and top of the booth, and incloses and protects the key-plate therein. The floor of the booth preferably projects beyond the ends and on the side next the voting compartment, forming ledges $d$ against which the lower edges of the side and ends of the voting compartment bear, when the same is collapsed, as clearly indicated in Fig. 1. It will be understood that the ledge on the side of the booth next the voting-compartment is cut out at the corners so as to permit the ends of the voting compartment to fit closely against the end-walls of the booth. The key-plate B is placed at some distance inside the booth, away from the voting compartment, so as to afford increased space for the voter. The booth and the voting-compartment are constructed of any suitable dimensions, and of any suitable materials, either wood or sheet-metal, or partially of each. The door D is hinged to the inner edge of the end-wall of the booth, at e, Fig. 1ᵃ, so that it may, when the voting-compartment is collapsed, fold inside the open portion of the booth. The door D, Fig. 1, when in the position indicated by the full lines in Fig. 1ᵃ, closes the opening in the end b of the voting compartment through which the voter passes in entering and leaving the machine. When the voting compartment is collapsed on the booth, the door is folded inward parallel to the key-plate, as indicated by the dotted lines in Fig. 1ᵃ, so as not to interfere with the voting compartment. A stop, F is provided when the voting-machine is set up for use, which limits the opening movement of the door, and prevents outside parties from looking into the booth so as to see the key-plate. This stop may be conveniently affixed to the roof of the voting compartment, reaching downward into the path of the door. It will of course be understood that the stop is removed in order to collapse the voting compartment. The limit of the inward movement of the door when the stop F is used to control it, is indicated by dotted lines in Fig. 1ᵃ. When set up for use the voting compartment is attached to the booth by catches, bolts or other suitable devices. The door D opens inward, being made somewhat wider than the opening in the end b which it closes, so as to prevent the view into the compartment when open. The door need not be provided with any lock or catch, when used in connection with the turnstile, although a spring or weight is preferably arranged to keep it shut. On the side opposite the voting compartment, the booth is provided with a removable or hinged door, G, provided with suitable locks, through which the counters are inspected at the close of an election, to determine the number of votes cast for the different candidates.

The turnstile E consists of the arms $f$ $f^1$ arranged at a suitable angle with each other and constructed to swing on a vertical shaft or axis $g$. The arms $f$ $f^1$ are preferably arranged at right angles with each other, so that when, on the entrance of a properly accredited voter, the arm $f$ swings inward a quarter of a turn, the arm $f^1$, will take its place,—thus closing the passage to the door D, until the voter emerges from the voting compartment. The shaft or axis $g$ is provided with a ratchet, $h$, Fig. 4, controlled by a weighted pawl $q$, which prevents the swinging of the arms of the turnstile except as the pawl is disengaged from the ratchet by a proper election official, after the intending voter shall have properly qualified. The turnstile however swings freely to allow the exit of the voter. The shaft $g$ of the turnstile is supported by a suitable hollow post, $j$, which may be bolted to the floor of the room in which the voting machine is installed, and this post is connected to the end-wall of the booth by a hollow arm $k$, the inner end of which may be detachably secured to the booth in any suitable manner. Inside the arm $k$ is placed the rod $l$, which is pivoted at its outer end to the crank $m$ on the shaft $g$ of the turnstile, and is connected at its inner end with the devices by which the voting mechanism is restored to its normal position, between each voting operation. When the turnstile swings inward, to admit a voter, the arm $l$ is drawn outward by the crank $m$, and this motion is transmitted inside the booth and operates to restore the voting mechanism, as shown in Fig. 1 and hereinafter described. The door permits a voter to leave the booth, in case he desires to ask for information, without operating the turnstile. It will be observed that, owing to the position of the crank $m$, the movement of the rod $l$ is at first rapid, and decreases gradually,—thus insuring the restoration of the voting mechanism before the turnstile has been fully opened. The arm $f$ is provided with a hinge $n$, and a lock, so that, when desired, the arm may be dropped down, as indicated by the dotted lines in Fig. 4, or otherwise moved out of the way, so as to permit access to the voting compartment under the control of the election official, who is provided with a key to the lock, without operating the rod $l$ and its connected restoring devices. A post $o$ and arm $p$ are arranged so as to form the side of the inlet passage opposite the turnstile.

It will of course be understood that when the voting-machine is collapsed, the turnstile, the posts and arms, and the rod $l$ are detached. The joint in the arm $f$ also facilitates shipment, by reducing the space occupied by the turnstile.

The coöperation of the turnstile and voting mechanism being entirely independent of the booth and voting compartment, it is evident the latter may be dispensed with, and my invention is designed to include such an arrangement.

The key plate, as it appears to the voter inside the voting compartment, is represented in Fig. 1 and shown in plan Fig. 7. The keys which represent the candidates for national or State officers are arranged in one group, while the keys for county or city or local officials are arranged in another group. Each of the keys in each group is arranged to operate its corresponding counter, and interlocking devices hereinafter described are provided by which the operation of more than one of the keys among those devoted to any particular office, is prevented, as indicated in Fig. 22. Each group is provided with mechanism for voting a straight ticket,—that is, for operating all the counters for all the candidates of any one political party, and each group is also provided with mechanism for registering any votes for irregular candidates, that is, for parties who are not regularly in nomination for the particular office by any of the political parties. On the left hand side of Fig. 7 I have represented that portion of the key-board which is devoted to Federal and State officials,—the local candidates being arranged on the right hand in the said figure. It will of course be understood that the machine is properly constructed as to the number of political parties, or the number of offices to be filled,—the accompanying drawings indicating the general arrangement. The pushes or keys which operate the straight ticket are arranged at the top of each vertical row. Thus, if the voter desires to vote for all the Democratic candidates for national and State officers, he operates the upper push, marked s in Fig. 7, in the Democratic column, and so on for any of the parties in either the national or local groups. If he desires to vote selectively, he will operate the pushes devoted to the candidates of his choice,—the names of all the candidates and the officers for which they are nominated being plainly displayed in any suitable manner in close proximity to the corresponding pushes. If the voter however desires to cast an irregular vote, he will operate the mechanism indicated at i in Fig. 7, by which the name of his preferred candidate (and the office if desired) is printed or recorded on a band of paper. This irregular voting mechanism is represented on an enlarged scale in front view in Fig. 13, and is shown in plan and side elevation in Figs. 14, 15 and 16, and indicated in perspective in Fig. 22. The mechanism is so arranged that the voter, by swinging a projecting lever and engaging it in notches marked with the letters of the alphabet and by then pushing it inward, spells out and prints on the paper the name of his candidate. Thus in Fig. 13 r represents the lever of the irregular-vote printing-mechanism, and the voter who desires to vote for an irregular candidate, say for Lewis Morgan, will swing the lever r in the slot t until he can engage it with the notch L, and he then pushes the lever inward as far as it will go, which movement prints the letter L on the paper. He then engages the lever r with the notch E, and pushes it inward, and the letter E is printed,—and so on, letter by letter, until the whole name of the desired party is spelled out and printed. A period is provided, to be inserted in place of spaces. The printing mechanism is so constructed that the paper is moved one space between each printing operation. It will be seen that the manipulation is simple, and easily learned,—the voter has merely to swing the lever r forward or backward in the slot t, as may be required, and to engage it in the proper notch, and then to produce the impression by pushing it inward until the printing is done. If the voter should print more than one name, only the first would be counted as a vote by the election officials. The construction is such that the irregular voter first pushes the key u, Fig. 7, opposite the name of the office for which he desires to vote for some person not regularly nominated, and this movement permits the lever r to be used, and interlocks all the regular keys for that particular office, so they cannot be used.

To proceed now to a description of the mechanism by which the irregular ballot is printed, it will be seen from Figs. 14, 16 and 22, that each of the irregular voting levers r is provided with a type wheel H, which is rotated by the swinging of the lever, and which is mounted on a sliding carriage L, which can be pressed toward the paper J by the lever r. The carriage and type-wheel may be arranged in any suitable manner for the purposes mentioned, but in practice I provide the lever r with a segment v which engages with a gear w attached to the type-wheel H.

K is a suitable support for the irregular printing mechanism, attached to the key plate or other suitable part of the machine. The type-wheel H and its connected parts are carried by a suitable frame L, supported on the plate K in any suitable manner, so as to reciprocate thereon, as by the screws and slots x in flanges extending outward from the frame. The reciprocating movement of the frame and type-wheel received from the lever r, is indicated by the full and dotted lines in Figs. 14 and 16. This movement brings the type-wheel H in contact with the paper J, supported by the roller M, which is sustained by a stud inserted in the plate K. The return movement of the carriage and type wheel is secured by a suitably arranged spring, or by the weight N, carried by a bell-crank lever pivoted to the plate K, and bearing by its bent end against the carriage. The carriage L is made of any suitable shape,—being in the accompanying drawings shown as bent upward over the type-wheel, and provided with flanges at its sides. The segment v at the inner end of the lever r, and the type wheel H and gear w are arranged to turn on suitable pivots attached to the carriage. Inside the carriage a plate y may be arranged to carry the gear and type-wheel. Any suitable mechanism may be employed to impart to the paper a step by step movement between the impressions made by the type-wheel. An ordinary pawl and ratchet mechanism may be employed for this purpose,—the pawl being pivotally attached to the carriage, and the ratchet wheel to one of the rollers over which the paper runs, or any other suitable mechanism may be employed for this purpose. I prefer however the mechanism shown in the accompanying drawings, in which the toothed wheel O is operated positively by the vibration of the pallets $z$ $z^1$ on the lever P which receives its motion from the carriage L. The lever P is pivoted at $a^2$ to a support on the plate K, and receives a vibratory motion from the carriage L by a bell-crank lever, or by the inclined slotted arm $b^2$ engaging with a pin on the carriage. The reciprocating movement of the carriage imparts a to-and-fro movement to the pallets, which causes the toothed wheel O to have a corresponding intermittent motion, and this actuates the drums $c^1$ $c^2$ on which the paper is wound. The band of paper is unwound from one of the rollers and wound onto the other, as the printing operation proceeds.

The pallets $z$ $z^1$ on the end of the lever P, which actuate the toothed wheel O and impart a step by step movement to the band of paper J, are provided with inclined edges and operate in the same manner as the pallets $t^1$ $t^2$ represented in Fig. 12. The proportions are so arranged as to move the paper at each printing operation the proper distance suitable for the type used on the wheel H. In order to avoid the use of ink, I wind a strip of carbon manifold-paper in with the band of paper J, either outside or inside, or between two bands,—the paper being arranged to move in the proper direction, and the roller M presenting a proper surface against which the impression may be made. The roller M is sustained by a stud arising from the base-plate K, and the rolls $c^1$ $c^2$ are arranged to revolve on suitable shafts.

It will of course be understood that the irregular voting mechanism is interlocked with the selective voting mechanism,—that is that when a voter presses in one of the pushes $u$, he cannot thereafter operate any of the other pushes in the same horizontal row, nor can he use the straight-ticket push. In a similar manner, if he votes the straight-ticket, he cannot use any of the irregular voting mechanisms, and if he votes selectively, he cannot use the irregular voting mechanism in the same row. The interlocking mechanism by which these results are accomplished are described hereinafter.

In Fig. 7, I have represented the key-plate B as provided with the pushes arranged in two divisions, one for the Federal and State offices, and another for the various county or local offices, an irregular voting device $i$ being provided for each office. In Fig. 8, I have represented all the candidates for all the offices as grouped in a single division, with only one irregular voting-mechanism, $i^1$, provided for all the offices,—the arrangement being such that the voter can not only print the name of his preferred innominate candidate, but the title of the office to which he desires that such person should be elected. This result is secured by providing the additional lever $r^1$, Fig. 15, and the type-wheel $H^1$, which is supported on the carriage L, and is pressed against the paper by the same movement which causes the wheel H to print. The arm or lever $r^1$ swings in a slot $t^3$ in the notched plate $h^3$, Fig. 13, the lower edge of which is provided with a series of notches marked to correspond with the various offices. The wheel $H^1$ is provided around its periphery with letters or marks indicating the various offices and corresponding with the marked notices below the slot $t^3$. The voter places the lever $r^1$ in the notch representing the office for which he desires to vote for an irregular candidate, and then, by using the lever $r$ as before described, he prints the letters of his candidate's name on the paper, and at the same time the wheel $H^1$ prints the office, or a suitable abbreviation for it, below each letter of the irregular candidate's name. In this way the name of the irregular candidate and the office for which he is proposed, are simultaneously printed on the band of paper. The arrangement is in other respects the same as that already described for the wheel H, and the operation is the same,—the lever $r^1$ being connected with the wheel $H^1$ by a pinion and gear, $v^1$ $w^1$, so that when the lever $r^1$ rests in one of the marked notches, the name of the corresponding office is presented to the roll M. The interlocking devices between the irregular voting device $i^1$ and the pushes or keys shown in Fig. 8, will be described hereinafter.

The general construction and arrangement of the selective voting mechanism will be understood from Figs. 17, 18, and 22—including the interlocking devices, the push-locking and restoring mechanism, and the counters, which are shown on an enlarged scale in Figs. 9 to 12 inclusive.

B, Figs. 17 and 18, also in Fig. 1, is the key-plate or push-plate, placed in front of the voting mechanism, where the voter in the voting compartment can have access to the selective voting pushes $p$, and the straight ticket pushes $s$, all of which project through the plate. The parts called pushes herein are also customarily styled indicators or keys. At its edges the key-plate is secured to the interior of the booth in any suitable manner, so that the voter cannot in any way interfere with the voting mechanism. At the rear of the voting mechanism is the plate B¹, which may be the rear wall of the booth, and which may be provided with the door G, by opening which the counters are inspected and the number of the votes cast for the different candidates determined at the close of the election by the proper officials. At each end of the voting mechanism, suitable bars or plates, C¹, Fig. 17, extend across between the plates B B¹, and serve to support the various operative parts. Intermediate plates or bars may be employed for these purposes if desired. There are also certain upright supporting bars, such as D¹ D², which sustain some of the mechanism,—these bars being attached to suitable plates forming the top and bottom of the booth, or to plates placed immediately above and below the voting mechanism,—the intention being to inclose the voting mechanism on all sides, so that its indications cannot be in any way changed during the progress of an election. The pushes $p$ are connected to or made in one piece with the bars R³, which extend across the voting mechanism and operate the counters S by a spring pawl and ratchet, or by the inclined pallets represented in Figs. 11 and 12, which engage with the teeth of the toothed wheel T and impart to it a step-by-step movement. When one of the pushes $p$ is actuated by the voter, the pallet $t^1$, acting by its inclined side against one of the teeth of the wheel T, imparts to it one-twentieth of a revolution, and, when he leaves the voting compartment, and passes through the turnstile E, the voting devices are all returned to their normal positions, (by connections hereinafter described), the bars R are moved from right to left in Fig. 17, and the pallet $t^2$ imparts to the wheel T the remaining twentieth part of a revolution, necessary to shift the counter one point or number. The wheel T has attached to it a disk $u^1$, which has a tooth $r^2$, Fig. 10, on its edge which operates the next notched disk $u^2$. The wheel T operates to register the units, being provided on its face with the numbers 0 to 9 as shown in Fig. 9, the disk $v^3$ on the notched disk $u^2$ registers the tens, and the disk $v^5$ registers the hundreds of the votes cast. The disk $u^1$ on the wheel T operates the disk $u^2$, and the latter operates the notched disk $u^3$,—the arrangement being such that each disk imparts a movement of one-tenth of a revolution to its left-hand neighbor in Fig. 9, when it has made a complete revolution. The three counter disks enable the machine to register the votes cast at any one election up to 999, which is sufficient for ordinary purposes, although the system may be extended by the employment of another disk, if desired. The toothed wheel T receives a step-by-step movement from the reciprocating motion of the pallets $t^1$ $t^2$ moving across the edge of the wheel, and engaging with one tooth after another and urging them onward in the direction of the arrow in Fig. 9. The pallets are constructed in any suitable way, and attached to the end of the push-bar R, which slides to-and-fro in a suitable opening in the case Z of the counter. It will of course be understood that each push and push-bar is provided with its corresponding counter. At the rear of each counter, as shown in Fig. 22, the case is closed by the removable plate O¹,—through which are made the openings indicated by the dotted circles $c^3$, through which the indications of the counter are examined. In Fig. 9, the counter is shown as set at 000, as it would be at the commencement of an election. The tooth $r^2$ on the disk $u^1$, Fig. 10, engages with one of the notches of the disk $u^2$ and imparts to the latter at the proper times one-tenth of a revolution. The periphery of the disk $u^1$ fits curved recesses in the ends of the teeth of the disk $u^2$, and prevents the latter from turning except when acted on by the tooth $r^2$.

$v^3$ is a numbered disk attached to the front side of the disk $u^2$. On the rear side of disk $u^2$ is fastened the disk $v^4$, which acts as a lock for the disk $u^3$, except when the latter is caused to make one-tenth of a turn by the pin $d^2$ projecting from the disk $u^2$, and adapted to engage successively with the notches in the disk $u^3$. A numbered disk $v^5$ is attached to $u^3$ by a collar or other suitable means.

The pin $d^2$ is inserted on the side of the disk $u^2$ opposite the toothed wheel T, so that it may not interfere with the rotation of the wheel. The disk $v^4$ is cut away as indicated at $l^5$, Fig. 10, to permit the movement of the disk $u^3$ when the pin $d^2$ is engaged in one of the notches in its periphery. The counting disks revolve on or with the shafts $e^3$ $e^3$. The shaft $e^4$ of the units counter may extend outward, and be squared or otherwise adapted for engagement with a rotary tool, by which the counter may be reset at 000, before an election begins,—such operation taking place when the bar is in such position that the teeth of the wheel T are free to revolve between the points of the pallets $t^1$ $t^2$, as indicated in Fig. 11. If the rotary tool be driven at high speed by a geared instrument resembling a breast-drill, the resetting to zero may be performed rapidly.

The counters are supported in proper relation with the sliding bars R, R¹, R² . . . by the uprights D², which are attached at their ends to any suitable stationary part of the machine. The bars R, R¹, R² . . . are supported at their front ends by the pushes which slide freely in openings in the plate B, and at their rear ends by being arranged to slide in guides in the arms $o^2$ attached to the bars $D^2$, Fig. 17, or in any other suitable manner, such as by being arranged to slide through the counters, as already described.

I provide for locking the push bars R, $R^1$, $R^2$ . . . against a return movement, either by accident or design, by means of the locking dogs or detents U, Figs. 18 and 22, which are pivoted on a rod $e^1$, extending between the plates $C^1 C^1$, and supported if necessary at one or more intermediate points by the upright $D^1$. Each of the push-bars R, $R^1$, $R^2$ . . . is provided with its corresponding locking dog U. The movement of the push-bars is indicated on one of the bars by the full and dotted lines in Fig. 18. The bars are recessed on their upper sides to receive the lower ends of the dogs U, and each of them is provided with a projection $o^1$ which bears against the dog, and, when the bar is actuated, swings its upper end over from left to right, until it reaches the position indicated at $u^1$ (see broken lines in Fig. 18). Each of the dogs is provided with a projecting pointed arm $n^1$, which, as the dog swings, engages successively with a series of notches $p^1$ on the side of the recess in the bar, until, at the end of the inward movement of the bar, it engages with the lowest of these notches, and thus prevents the return movement of the bar. The dogs are raised, or shifted from their locking positions such as indicated at $U^1$ to their normal position shown in full lines in Fig. 18 and denoted by U, and the bars unlocked in the following manner:—When the voter passes through the turnstile on leaving the voting compartment, he imparts a partial revolution to the rock-shaft I, inside the booth, through the crank $m$, the rod $l$, the bell-crank-lever $m^1$, the connection $q^1$, and the crank $d^1$, (see Figs. 1 and 4), and this movement, by the arms $g^1$, Figs. 17 and 18, and the sliding bars or lifting-rods Q, which are provided with the pins $h^1$ engaging under the dogs, raises the dogs and disengages them from the push-bars as will be clearly understood from Fig. 22. The swinging movement of the arms $g^1$ is indicated by the full and dotted lines in Fig. 18. The upward movement of the lifting rods, which causes the dogs to swing from $U^1$ to U, also returns the bars by means of the dog taking hold of the shoulder $o^1$ moving them from right to left back to their normal position, and this movement completes the movement of the counter and places the machine in condition to receive and register the next vote. When the next voter enters and operates the turnstile, the rock-shaft is turned in the opposite direction, the arms $g^1$ swing from the elevated position indicated by the dotted lines to the lower position, the lifting rods Q are depressed, and the pins $h^1$ are removed from contact with the dogs, so that the pushes and bars can be operated by the voter. The dogs will remain in the elevated or upright position, because the points $n^1$ rest on the upper edges of the bars R, $R^1$, $R^2$ . . . just back of the recesses in them. The rod $e^1$ being below the projections $o^1$ on the bars, the latter are returned by the upward swinging motions of the dogs. Before any of the bars can be again actuated, the pins $h^1$ must be depressed, so as to allow the dogs to swing, and this is accomplished by the movement of the rock-shaft I, as already described. Any suitable means for preventing lateral displacement of the dogs on the rod may be employed. All the dogs of all the pushes will be unlocked from their corresponding push-bars simultaneously by the movement of the rock-shaft I. The rock-shaft I is supported by suitable journals attached to the rear plate $B^1$, and arms from these journals $t^4$, Fig. 18, may extend inward and sustain the uprights $D^2$ which carry the counters.

From the foregoing it will be understood that the turnstile and connections put the registers corresponding to selected and actuated keys in condition for counting or registering the vote by means of a jointed frame comprising rock bar I, arms $g^1$ and bars Q.

The interlocking mechanism is represented in Figs. 17, 18 and 22. It consists essentially of a series of pivotal slats, V, $V^1$, $V^2$, $V^3$, . . . corresponding in number with the push-bars,—each slat being connected with one of the push-bars, so that, when its bar is actuated, it swings or moves into notches in the key bars, and serves to prevent their movement. The bars R, $R^1$, $R^2$ . . . are provided with a series of notches, $s^1$, Figs. 18 and 22,—which in the particular arrangement shown, are in the lower edges of the bars. The slats V, $V^1$, $V^2$ . . . are pivoted on one edge in the plates $C^1 C^1$, or other suitable supports, as indicated at $j^1$, $j^2$, Fig. 17. Each of the slats is provided with an arm, $x^1$, which is connected to one of the bars by a pin and slot, or other suitable device. When the bar is pushed in, its corresponding slat is caused to swing on its pivots so that its free edge enters the notches in all the other bars, which represent the same office, and locks them against being pushed inward. The position of one of the slats, $V^3$, at this time, is indicated by dotted lines in Fig. 18. Each slat is provided with a notch, $s^3$, Fig. 17, where it crosses the bar to which it is connected so that it may swing upward when its bar is actuated. When the bars are returned, by the action of the rock-shaft I, as already described, the slats are swung back to their original positions, and the pushes are then all unlocked, so that selective voting may be again practiced. It will be understood that the number of pushes, bars, and interlocking slats will be made to correspond with the number of parties, and the candidates to be voted for,—the acompanying drawings showing only so many of such parts as may be requisite for a clear understanding of the principle on which my interlocking devices operate.

In Figs. 5 and 6, I have represented a modified arrangement of the interlocking slats, in which they are caused to move endwise to engage with the notched push-bars, instead of swinging on pivots. Each bar is connected to its corresponding locking slat by the bell-crank $x^2$, pivoted to any suitable support,—such as a bar X, Fig. 6, extending across the machine,—the arrangement being such that when one of the bars is pushed in, its corrresponding interlocking slat is shifted endwise laterally of the push-bar as indicated by the full and dotted lines with regard to the bar $R^6$ and the slat $V^6$, Fig. 5. The bars are provided with the notches $s^2$, Fig. 6, in which the slats engage when shifted laterally,—it being understood that each of the slats is provided with a corresponding notch where it crosses a bar to which it is connected, by one of the bell-cranks $x^2$,—so that the bar is free to move inward. In Fig. 5, if the bar $R^6$ be pushed inward, the slat $V^6$ will be shifted laterally and will engage with the notches at $s^2$ on the lower side of the bars $R^7$, $R^8$, and will lock these fast. In a similar manner, if the bar $R^7$ be actuated, the slat $V^7$ will lock the bars $R^6$ and $R^8$. The slats may be supported by the bars X, or by any other suitable device,—provision being made for allowing them free endwise movement. Each of the push-bars in this arrangement is provided with a locking-dog, counting mechanism and returning devices, in a manner similar to that already described.

The straight ticket mechanism consists of a suitable push, $s$, Figs. 7, 8, 17 and 18, (preferably located at the top of each vertical row of candidates, all belonging in the same political party,) and a rock-shaft, Y, which is provided with a series of arms $k^1$,—one for each key, push-bar and counter in each vertical row,—by which the mechanism is operated so as to cast simultaneously votes for all the candidates of any one political party. The push-bars of the straight-ticket pushes $s$ may be provided with counters, as indicated at S, Figs. 17 and 18, if desired, so that the number of solid party votes cast may be known. Otherwise, the counters being omitted, the push bars are provided with the locking dogs, the restoring mechanism, the interlocking notches and slats, as already described. An arm $l^1$, Figs. 17 and 18, is fastened to the rock-shaft Y just above the upper or straight-ticket push-bar, which is provided with a pin or projection $a^3$, which bears on the outside of the arm and imparts to the rock-shaft a partial rotation when the corresponding push $s$ is actuated. The arms $k^1$ are fastened to the rock-shaft in such positions as to engage with their corresponding push-bars, and pins or lugs $i^2$ on the bars on the inside of the arms $k^1$ cause the bars to move inward when the rock-shaft Y is operated, as shown in Fig. 22. In this manner the actuation of any one of the straight pushes, operates all the push-bars in its vertical row, and these bars operate their corresponding interlocking slats,—so that after casting a straight party vote, the voter cannot vote for any candidate of any other party. The restoration of the parts to normal position ready for the next voter, is accomplished in the manner already described. It will be understood that each vertical row of pushes, comprising all the candidates of any one political party, is provided with its straight ticket rock-shaft and operating levers. The rock-shafts are supported in place in any suitable way, as by the arms $p^3$ attached to the plate B.

The mechanism by which the irregular voting mechanism is interlocked with the selective and straight ticket voting mechanism will next be explained.

One of the interlocking slats, such as $V^9$, Figs. 17, 18 and 22, is extended beyond the selective voting mechanism, and operates to prevent the type-wheel H, Figs. 15 and 16, from being pushed against the paper. The push $u$ of the irregular voting mechanism is provided with a push-bar which is connected with the slat $V^9$ by a pin and slotted arm, in a manner exactly like that shown at $x^1$ Figs. 17 and 18. The push $u$ and its push-bar thus impart a partial rotation to the interlocking slat $V^9$, in the same way as the push $s$ and its bar $R^3$ rocks the slat $V^3$ in Figs. 17 and 18,—the slat $V^9$ being provided with a notch similar to $s^3$, Fig. 17. The slat $V^9$ rests in contact with the carriage L or a lug thereon, as indicated by the full lines in Fig. 14, and prevents any printing being done, until, by operating the push $u$, the voter turns the slat $V^9$ up out of the path of the carriage, and at the same time locks all the push-bars in the same ho ontal line,—that is all the voting devices for candidates for the same office, so that they c n-not be operated. The push-bar of the push $u$ is also provided with a locking dog, and the restoring mechanism, as already described. The voter, after having actuated the push $u$, is free to print the name of his preferred innominate candidate on the band of the paper, but he cannot vote for any regular candidate for the particular office represented by the pushes in that horizontal row, because the slat $V^9$, being engaged with the notches in the push bars of such row, prevents the operation of any of them, while at the same time it prevents the voter from using any of the straight ticket voting mechanisms. The slat $V^9$ extends over the irregular voting mechanism, and its end is supported by a journal $j^3$ in the transverse bar $C^2$, Fig. 16. $m^2$, Figs. 14 and 22, is a lug on the carriage L, which prevents the inward movement of the carriage when the slat $V^9$ is down, as indicated by the full lines. A finger, $z^2$, Fig. 14, attached to the slat $V^9$ opposite the printing roll M, serves to make the impression of a line or row of dots on the band of paper between each irregular vote. The end of the finger $z^2$ is pressed against the paper supported by the roll M when the slat $V^9$ is in position to prevent the movement of the type-wheel toward the paper, and this pressure makes a mark on the paper between each impression of an irregular vote. When the slat $V^9$ is rocked up so as to permit the type-wheel to print on the paper, the arm $z^2$ is moved out of contact with the paper, but when the type-wheel is locked by the slat, the arm $z^2$ is swung against the paper and produces an impression thereon, by pressure on the carbon manifold-paper,—and this impression comes between and separates each registration of an irregular vote. This arrangement facilitates the counting of the irregular vote, which is done by removing the paper from the rolls and counting the number of votes cast for the irregular candidates.

Proceeding now to a description of the multicandidate group, that is when two or more candidates are nominated for the same office by the same party, which is shown in Figs. 19 and 20, it will be observed that in the drawings provision is made for voting for any five coroners, (or other officers) out of a total of twenty put in nomination by four political parties. The system may however be employed for a different number of candidates for the same office, or for a different number of parties. In Fig. 19, which shows the pushes, push-bars, etc., for a vertical row of five candidates, $R^{10}$, $R^{11}$, $R^{12}$, $R^{13}$, $R^{14}$ represent the push-bars for a vertical row of five candidates for coroner, all nominated by the same party. Each of these bars is provided with a push, a counter, a locking dog and restoring mechanism, as already described and illustrated in Figs. 17 and 18. Each of the vertical rows of pushes, etc., in the multicandidate group, is provided with the straight-ticket rock-shaft Y, levers and pins, as already described,—said rock-shaft being operated by the push $s$, Fig. 7, at the head of the row on the push-bar $R^9$, Fig. 19. In this case the pin $a^3$ is placed outside the lever $l^1$, so that the lever and rock shaft are worked by the bar, instead of the reverse.

$I^1$ is a rod extending through the multicandidate group, and supported at its ends by suitable plates or bars $C^3$, attached to any suitable stationary parts of the machine. All the push-bars in any one vertical row are provided with the interlocking rods $L^1$, $L^2$, $L^3$, $L^4$, $L^5$, of the same class or type, being substantially identical in form and operation. These rods are pivoted at one end to their respective push-bars, at $z^3$, and so bent and shaped that their other ends are engaged by the slots $y^2$ side by side on the rod $I^1$. Fig. 20 represents the parts below line 20—20, Fig. 19. The slotted ends of adjacent interlocking rods $L^1$, $L^2$, $L^3$, $L^4$, $L^5$ cross each other at substantially right angles, and each of the bars is provided with the inclined surface or interlocking wedge $x^3$, see Fig. 21. The arrangement is such that when one of the interlocking rods is thrust inward, as indicated with regard to rod $L^1$ by the full and dotted lines in Fig. 19, the wedge $x^3$ on it enters beyond the edges of the other rods, and partially fills the space allotted to the rods lengthwise on the rod $I^1$. Beyond the wedges $x^3$, the interlocking-rods terminate in a flat projection $w^3$, which is thinner than the body of the rod. At each end of the rod $I^1$ are placed the collars or abutments $v^6$, $v^7$, Fig. 20, which are placed at such a distance apart that the proper number of interlocking rods may be thrust inward,—the slots $y^2$ sliding on the rod $I^1$,—but that no more can be actuated, because the thickened portions of the rods occupy all the space between the abutments, and no other wedge can enter. In the unvoted position, the wedges $x^3$ on each of the rods, is outside of the adjacent rods, but when the push-bars are actuated, the corresponding interlocking rods are thrust inward, (see full and dotted lines $L^1$, Fig. 19,) and their thickened portions fill up the space between the abutments. When this interlocking mechanism is adapted to three or more vertical rows of pushes, as indicated in Fig. 20, suitable spacing blocks, $u^5$, $u^6$, may be employed,—being arranged to slide lengthwise of the rod $I^1$. In the particular instance shown, where four rows of five pushes each are grouped together by the same interlocking mechanism, the ten interlocking rods of each pair of rows are conveniently brought together by bending the rods toward each other as shown, and these two sets are separated by the sliding spacing block $u^5$,—the block $u^6$ being also used, if desired,—and the abutments $v^6$ $v^7$ are separated by such a distance as will only permit five of the wedges $x^3$ to be inserted between them. Then the voter can vote for any five of the twenty candidates, voting for all the five candidates of any particular party, or splitting his voting as he may desire, but after he has voted for the five, he cannot vote for any of the other candidates in the group, since the wedges fill the whole space allotted to the rods lengthwise on the rod I¹. It will be understood that the interlocking rods are pivoted on their respective push-bars in such manner as to permit the requisite amount of lateral movement to the rods. The length of the spacing block or blocks is of course proportioned for this purpose. It will be readily understood that the system may be adapted to any other number of rows or of pushes. In the instance shown, the voter can vote for any five candidates out of the twenty,—such five being selected from any of the parties, but, after voting for his five preferred persons, he cannot vote for any of the other candidates.

Suitable guides are employed for the bars or lifting-rods Q, such as indicated at $t^5$, Fig. 17, attached to the bars D². The particular form and dimension of such reciprocating rod or bar Q is immaterial, and any suitable construction may be used.

I provide my improved voting machine with a clock which indicates the length of time a voter has been in the booth. Any suitable clock-mechanism will answer the purpose, being provided with a minute hand only, which hand is set back to zero by the depression of the treadle $q$ by the election official, when he admits a voter to the booth. The clock may be provided with two hands, one of which is visible from the outside, as in Fig. 4, and the other from the interior of the booth, as represented in Fig. 3. These hands are attached to the opposite ends of a spindle which extends through a hollow shaft of the clock mechanism,—the spindle being driven by friction. The clock-mechanism is located in the wall of the booth, between the two hands. Suitable connections are made between the treadle $q$ and a sliding bar $n^3$, Fig. 3, so that the hands are brought back to zero when the treadle is depressed. The bar $n^3$ is arranged to slide in suitable guides along the interior surface of the wall of the booth, and it is provided with a pin $l^3$ which projects through a slot in the dial, and bears against the hand. When the bar travels from left to right in Fig. 3, the pin $l^3$ turns the hand back to zero.

$f^3$, Figs. 3 and 4, represent suitable rods by which the movement of the treadle $q$ is carried to the bar $n^3$,—suitable bent levers, $g^3$, being used to transmit the motion around the corners. The rods $f^3$ extend from the treadle up through the post $j$ and tube $k$, so that they are protected from interference.

The handles $r$ and $r^1$ Fig. 15 are provided with the movable sectors, $l^4$, which close the slots in which the handles swing, so as to prevent any person in the voting compartment from interfering with the voting mechanism by the insertion of rods or other instruments through the slots. The sector may be fastened to the handle and swing with it, or it may travel in suitable guides, while the handle slides through it, when the printing is done.

The method of operating the irregular-vote printing-mechanism, when only a single printing mechanism is employed, will be understood from Figs. 8, 15 and 16. The voter who desires to vote for an irregular candidate, say for Congress, will push the key $u^7$, Fig. 8, opposite the row of pushes devoted to the different candidates for such office, and this movement locks all the regular pushes, $p^4$, in such row, and unlocks the irregular-vote printing-mechanism $i^1$, so that the voter can use that to register his choice. He brings the lever $r^1$ into the notch marked Congress, and then by working the lever $r$ and pushing it inward, prints the name of his preferred candidate on the paper, and, at the same time, the wheel H¹ prints the word Congress or some suitable abbreviation, opposite each letter of the name. If the voter should print more than one name, only the first will be counted, or the whole vote will be rejected. The marker $x^4$, Fig. 15, will indicate on the paper, the point where each separate voter began and stopped the printing operation,—such marker being operated, as indicated by the full and dotted lines, by the lifting rod Q, the lever $d^3$ and connection $k^2$. The marker causes the inking ribbon or carbon-paper to make a line on the paper, to show where each voter began his printing. The push $u^7$ is attached to a reciprocating notched push-bar R¹⁵, and is connected with an interlocking slat V¹⁰, Fig. 15, by an arm $x^5$. When the push $u^7$ is operated, the slat V¹⁰ is rocked, and it interlocks all the push-bars of the regular voting-mechanisms in the same horizontal row, as already described. The movement of the slat also unlocks the printing mechanism so that it can be used. The connection $w^2$ is pivoted at its lower end to an arm on the slat V¹⁰, and at its upper end to a sliding stop N¹, Figs. 15 and 16, which engages with a notch $b^3$ in the handle $r^1$. When the slat is rocked, the stop N¹ is drawn downward and its end withdrawn from the notch $b^3$, so that the printing wheels can be forced inward into contact with the paper about the roll M. It will be understood that there are a series of stops N¹,—one corresponding to each of the offices represented on Fig. 8, and that these stops are so located that they engage with the notch $b^3$ in the handle $r^1$ when the handle is in the notch in the plate $h^3$ which corresponds with the office for which an irregular vote is to be cast. Each of the vertical row of pushes $u^7$ is provided with its corresponding interlocking slat, and each slat is connected with a stop N¹. The operation of the push $u^7$ (for Congressman) will cause the corresponding stop N¹ to be depressed, so that,—the handle $r^1$ being engaged in the notch in the plate $h^3$ which corresponds to Congressman,—the printing mechanism can be operated to print a name and an abbreviation for Congressman under each letter of the name. In a similar manner the operation of the push in the row $u^7$ opposite the row of pushes devoted to candidates for governor, will depress the stop $N^2$, Fig. 16, which is so located as to engage with the handle $r^1$ when it rests in the notch marked Governor in the plate $h^3$. When the handle occupies this notch, the word Governor, or a suitable abbreviation, is presented by the type-wheel $H^1$ in position to print on the paper J. The name of the preferred candidate is then printed on the paper, along with the word Governor, by the voter, by operating the lever $r$ as already described.

In order to provide for positively returning the printing mechanism after a printing operation, I attach a cam $o^4$, Fig. 15, to the lifting-rod Q, and cause it to act on a sliding bar $m^3$, which bears against a stud or lug $n^4$ on the carriage L. When the rod Q rises, the bar $m^3$ is forced toward the key-plate B, and this movement returns the printing mechanism positively to its normal position, and forces it away from the paper. The bar $m^3$ is supported at its rear end by suitable guides, and it may also slide on the shaft which carries the roll M.

In the multicandidate group, each of the push-bars $R^{10}$, $R^{11}$ . . . Fig. 19, at one side of the group, is provided with cams which operate a slat $V^9$ which interlocks with the irregular-vote printing-mechanism of the same horizontal row of candidates, see Fig. 7, in which an irregular-vote printing mechanism is shown opposite each row of candidates for the same office by the different political parties. This mechanism consists of an interlocking-slat, $V^9$, Figs. 19 and 20, which prevents the operation of the printing mechanism, as shown in Fig. 14, and which is provided with arms carrying the lugs $r^5$ $r^6$ Fig. 19, which are acted on by the inclined surfaces $s^5$ $s^6$ on the push-bars $R^{10}$, $R^{11}$ . . ., Fig. 19. By this construction, the irregular-vote printing-mechanism is interlocked with the regular voting mechanism, the printing mechanism being provided with a lug $m^2$, as in Fig. 14, which bears against the slat. In this case, the pushes $u$ opposite the multicandidate group may be omitted.

It will also be understood that instead of printing, the irregular vote may be registered by perforating the paper, as is now practiced in some of the check-perforating machines. It will also be understood that the sliding bars, etc., may be arranged to be operated by a pull. When the irregular-vote printing-mechanism is arranged opposite each row of candidates for any particular office, the printing wheel $H^1$, handle $r^1$ and the notched plate $h^3$ are omitted.

Many changes may be made in the construction of my improved voting machine, without departure from the leading principles thereof. Thus the turnstile may be of any suitable construction, and the voting mechanism proper may be used in any suitable style of booth, and with any suitable inlet mechanism. The irregular vote printing device may be constructed in many different ways, the fundamental feature of enabling the voter to register the name of his preferred candidate, letter by letter, being retained, and suitable interlocking mechanism being provided. The interlocking slats may be arranged to slide endwise, as indicated in Figs. 5 and 6, instead of being pivoted, and they may be placed either above or below the push-bars. The push-bars may be provided with holes or openings in which projections on the interlocking slats engage, or vice-versa. Any suitable counters may be used, and any suitable devices employed for imparting a step-by-step movement to the units disk or numbered wheel from the reciprocating push-bar. Any suitable locking dogs or detents may be employed, to lock the push-bars against a return movement, and the restoring mechanism may be altered by causing the lifting rods to act directly on the push-bars, instead of through the locking-dogs, as in the particular construction shown. The straight-ticket mechanism may be omitted, or varied in any suitable way, so as to operate all the counters for the candidates of any one political party from a single key or push operated by the voter. The number of pushes for the candidates, and the number of political parties, may be varied to suit the requirements of any given election, and unnecessary or unused pushes may be covered by a suitable cap or other device, or they may be removed from the machine. The manner of supporting the various operative parts may be varied, and any suitable construction of the frame-work adopted which permits the relative coöperation of the mechanisms which register the votes, and prevent voting for more than one candidate for the same office. The construction of the counter may be varied, and any suitable devices employed for transmitting the movement of the units wheel or disk to the tens and hundreds registers, but it is preferable to make such transmission positive, as herein described, and to lock the registering devices against accidental movements. The voting mechanisms may be arranged in one, two, or more groups, in each group a straight-ticket voting-mechanism being preferably provided. The construction of the interlocking devices of the multicandidate group or groups may also be variously modified or altered,—the essential feature of the thickened rods being employed, as indicated in Fig. 20, which is a view of those parts located below the plane of line 20—20, Fig. 19. If desired the multi-candidate mechanism may be arranged to lock any of the push-bars desired, the change of arrangement being an obvious one within the province of the skilled mechanic. The clock-mechanism may be omitted, or variously modified. The connections between the turnstile and the rock-shaft of the restoring mechanism may be arranged in any suitable way. Any suitable device may be employed for feeding the paper of the irregular-voting mechanism, and the paper may be fed either lengthwise or sidewise. The skilful constructor will readily understand how he can vary from the precise indications of the machine herein described and illustrated, and secure the advantages of the simplicity and cheapness of construction hereinbefore set forth and represented.

I claim:

1. The combination with the booth of a voting machine, having a key-plate across one side carrying suitable vote-registering mechanism with means for operating the same accessible from the voting compartment only, of the voting compartment open on one side next the booth and having its end walls separated by a distance greater than the length of the booth, and adapted to slide over the ends of the booth when the machine is collapsed, substantially as described.

2. The combination with the booth of a voting machine provided with suitable vote-registering mechanisms, of the voting compartment open on the side next the booth and having its end walls separated by a distance greater than the length of the booth, and adapted to slide over the ends of the booth, and a door hinged to one edge of the end wall of the booth, and adapted to close an opening in one end of the voting compartment when the machine is set up and to fold inward between the booth and the inside of the compartment when the machine is collapsed, substantially as described.

3. The combination of the booth A of a voting machine, provided with a suitable key-plate B carrying vote-registering mechanisms, and provided with the projecting ledges $d\,d$ at the bottom of the opposite ends thereof, and the voting compartment, consisting of the side-wall $a$, the ends $b\,b^1$ and roof $c$, collapsible on the booth with the lower edges of the ends $b\,b^1$ in contact with the ledges $d\,d$, substantially as described.

4. The combination with the booth containing the voting mechanism, of the voting compartment arranged to telescope upon the booth and provided with a suitable door giving access to the voting mechanism, the turnstile removably located outside of and independent from the booth or compartment, a detachable arm connecting the turnstile and booth at one side of the door, and the detachable arm secured to the voting compartment on the opposite side of the door.

5. The combination of the booth A of a voting machine, having vote-registering devices arranged along one side thereof, the voting compartment C open on the side toward the booth and consisting of the roof $c$, the side-wall $a$ and the two ends $b\,b^1$, separated by a greater distance than the length of the booth, the door D, and the exterior turnstile E located at the outer end of a passage leading to the door of the voting compartment, and suitable connections between the turnstile and the voting mechanism in the booth, whereby such mechanism is restored to normal position by the inlet movement of the turnstile, substantially as described.

6. The combination, in a voting machine, of a movable part adapted to be operated by a voter, a vote-registering device, a printing mechanism for recording an irregular vote, and suitable interlocking mechanism between the vote-registering device and the printing mechanism, substantially as described.

7. The combination, in a voting machine, of a series of movable parts adapted to be operated by a voter, a corresponding series of vote-registering devices, the straight-ticket voting device, whereby all the registering devices may be actuated simultaneously, a printing mechanism for recording an irregular vote, and suitable interlocking mechanism, substantially as described.

8. The combination with a key-plate of a voting machine, supporting regular vote-registering mechanism, of an irregular vote printing mechanism, comprising the type-wheel located behind the key-plate, the handle for operating the type-wheel projecting through a slot in the key-plate, the notched and lettered plate with which the handle engages the paper-supporting roll, suitable paper-feeding mechanism, and suitable interlocking mechanism adapted to prevent a voter from voting regularly and printing an irregular vote, substantially as described.

9. The combination with the resetting mechanism of a voting machine, of the exterior turnstile E, shaft $g$, post $j$, pipe $k$, and suitable concealed connections between the shaft and the resetting mechanism, substantially as described.

10. The combination with the push-bar R, provided with lug $o^1$, of the counter S, and the pivoted locking dog U, substantially as described.

11. The combination with the push-bar R, provided with lug $o^1$, of the counter S, the pivoted locking dog U, and the lifting bar Q, substantially as described.

12. The combination with two or more notched push-bars, of their corresponding counters S and locking dogs U, and two or more pivoted interlocking slots, each attached to one of the push-bars so as to be operated thereby and adapted to engage in the notch or notches of the other push-bar or bars, substantially as described.

13. The combination of two or more series of notched push-bars and their corresponding counters, each series representing the candidates of a political party, two or more series of movable interlocking slats, each connected to one of the series of push-bars, and adapted to engage in the notches of the bar or bars of the other series, and two or more straight ticket rock-shafts, each adapted to simultaneously operate all the counters representing the candidates of a political party, and to lock out the counters in the other series, substantially as described.

14. The combination in a voting machine, of the irregular-vote printing mechanism, comprising the type-wheels H $H^1$, one lettered with the alphabet and the other with the name of the office, the handles $r$ $r^1$ and suitable connections between the handles and the type-wheels, the notched and suitably marked plates $t$ and $h^3$, and the paper supporting and feeding mechanisms, substantially as described.

15. The combination in a voting machine, of the irregular-vote printing mechanism, comprising the type-wheel H, the handle $r$, the paper supporting and feeding mechanisms, and the marker $z^2$ arranged to act on the paper between each vote-printing operation, substantially as described.

16. The combination with the irregular-vote printing mechanism, of a notched push-bar and its vote-registering device, the push for unlocking the printing mechanism, the pivoted slat $V^9$ and marker $z^2$, substantially as described.

17. The combination, with a row of pushers, push-bars and counters in the multicandidate group, of the thickened interlocking-rods $L^1$ $L^2$, the rod $I^1$, abutments $v^6$ $v^7$, interlocking slats $V^9$, suitable connections between the interlocking slats and the push-bars, the irregular-vote printing mechanism $i$, and the straight-ticket push S and rock shaft Y, substantially as described.

18. In a voting machine, reciprocating elective push-bars and corresponding counters, said bars carrying interlocking parts movable transversely of other like parts and adapted when the bars are operatively moved to directly interlock with said like parts to prevent the operation of other push-bars, said interlocking parts comprising slats horizontally arranged beneath and operated by the push-bars, substantially as described.

19. The combination with the booth of a voting machine, of the oscillating turn-stile E, comprising two arms at about a right angle to each other, and suitable connections between the turn-stile and the voting mechanism in the booth to restore the voting mechanism to normal position by the exit movement of the stile, and a hinged arm $f$ to permit entry without affecting the voting mechanism and to provide for close storage, substantially as described.

20. The combination with the booth of a voting machine, of the oscillating turn-stile comprising two arms, suitable connections between the turn-stile and the voting mechanism to restore the latter to normal position by the exit movement of the stile, one of said arms of the turn-stile having a hinged member to permit entry to the machine without affecting the voting mechanism, and means for locking said hinged member against independent movement, substantially as described.

21. In a voting machine, two or more notched reciprocating slide bars in an office row and there being two or more party rows, a rotatable member for each row having a lateral extension adapted to enter a row of notches and contact with all the slide bars in the same office row except the notch of the voted bar, and a single resetting bar movable longitudinally of itself and at an angle to the notched slide bars in the same party row.

22. In a voting machine, keys and mechanism for regular voting, keys and mechanism for irregular voting, interlocking mechanism between the two kinds of keys, said mechanism for irregular voting including a vote-receiving fabric, and means for recording a vote on the fabric consisting of a rotary part having symbols thereon, the location of the symbols on the rotary part and their relation to the fabric being such that only one symbol at a time can come in contact therewith.

23. In a voting machine, keys and mechanism for regular voting, keys and mechanism for irregular voting, interlocking mechanism between the two kinds of keys, said mechanism for irregular voting including a vote-receiving fabric, and means for recording a vote thereon consisting of a rotary part having symbols, the location of the symbols on the rotary part and their relation to the fabric being such that only one symbol at a time can come in contact therewith, and means independent of the rotary part for transferring the design of the symbol to the fabric.

24. In a voting machine, keys and mechanism for regular voting, keys and mechanism for irregular voting, interlocking mechanism between the two kinds of keys, said mechanism for irregular voting including a vote-receiving fabric, means for recording a vote thereon consisting of a rotary part having symbols, the location of the symbols on the rotary part and their relation to the fabric being such that only one symbol at a time can come in contact therewith, and means imparting a step by step movement to the rotary part.

25. In a voting machine, keys and mechanism for regular voting, keys and mechanism for irregular voting, interlocking mechanism between the two kinds of keys, said mechanism for irregular voting including a vote-receiving fabric, means for recording a vote on the fabric, consisting of two rotary parts having their peripheries in the same plane, symbols on both peripheries, and means for bringing a symbol on each periphery in contact with the vote receiving fabric at one and the same time.

26. In a voting machine, keys and mechanism for regular voting, keys and mechanism for irregular voting, interlocking mechanism between the two kinds of keys, said mechanism for irregular voting including a vote-receiving fabric, a face plate having the names of the series of offices to be voted for printed thereon, means for recording one vote for each office, consisting of a rotary part with symbols on its periphery, and means other than the rotary part or fabric for transferring the design of the symbol.

27. In a voting machine, keys and mechanism for regular voting, keys and mechanism for irregular voting, interlocking mechanism between the two kinds of keys, said mechanism for irregular voting including a vote-receiving fabric, a face plate having the names of a series of offices to be voted for printed on the face plate, means for recording one vote for each office, consisting of a rotary part with symbols on its periphery, and means for bringing the symbols in contact with the fabric.

28. In a voting machine, keys and mechanism for regular voting, keys and mechanism for irregular voting, interlocking mechanism between the two kinds of keys, said mechanism for irregular voting including a vote-receiving fabric, a face plate having the names of a series of offices to be voted for printed on the face plate, and means for recording one vote for each office, consisting of a rotary part with symbols on its periphery, and an interlocking mechanism connected with both recording mechanisms.

29. In a voting machine, keys and mechanism for regular voting, keys and mechanism for irregular voting, said mechanism for irregular voting including a vote-receiving fabric, a face plate having the names of the series of offices to be voted for printed on the face plate, and means for recording one vote for each office, consisting of a rotary part with symbols on its periphery, and interlocking mechanism connected with both recording means, and a resetting mechanism actuated by the voter as he leaves the machine.

30. In a voting machine, keys and mechanism for regular voting, keys and mechanism for irregular voting, said mechanism for irregular voting including a vote-receiving fabric, means for recording on the fabric one vote for each office, consisting of a rotary part with symbols on its periphery, and means other than the rotary part or fabric for transferring the design of the symbol onto the fabric, and means for positively separating the recorded vote of a voter from that of the succeeding voter.

31. In a voting machine, keys and mechanism for regular voting, keys and mechanism for irregular voting, said mechanism for irregular voting including a vote-receiving fabric, means for recording on the fabric one vote for each office, consisting of a rotary part with symbols on its periphery, and means other than the rotary part or fabric for transferring the design of the symbol onto the fabric, means actuated by the voter for positively separating his recorded vote from that of the succeeding voter, and means for presenting a fresh vote-recording space for each voter to record his vote.

32. In a voting machine, keys and mechanism for regular voting, keys and mechanism for irregular voting, interlocking mechanism between the two kinds of keys, a resetting mechanism, and an indicator carrying one or more symbols and adapted to be reciprocated by the voter to indicate his choice on the surface of a movable fabric, said fabric being moved step by step on the actuation of the resetting mechanism by the voter on his leaving the machine.

33. In a voting machine, having a common entry and exit, a face plate having indicators, an oscillating arm and an oscillating door or screen which screens the face plate while the voter is in the booth, said arm and door being oscillated and the final registry of the selected indicators completed on the exit of the voter.

34. In a voting machine, keys and mechanism for regular voting, keys and mechanism for irregular voting, interlocking mechanism between the two kinds of keys, a slide bar actuated by the voter, a resetting bar, locking mechanism for the slide, the locking mechanism including means for locking the slide bar step by step against return as actuated, but permitting its return by the resetting bar.

35. In a voting machine, the combination of an operating vote indicator, a register operatively connected therewith, a detent for said indicator, a reciprocating bar arranged and adapted to control the operations of the indicator and release said detent, an oscillating part arranged to control a passage leading to and from the apparatus, and connections between said part and bar whereby the movements of the oscillating part lock and unlock the vote indicator.

36. In a voting apparatus, the combination with the vote indicators and the counters or registers operatively connected therewith, of a reciprocating bar arranged and adapted to control the vote indicators, an oscillating part controlling a passage leading to and from the apparatus and adapted to move a quarter rotation in either direction and alternately opening and closing the same, and connections between said oscillating part and reciprocating bar for operating the latter, the connections being such that when the oscillating part is at one end of its path the vote indicators are free to be operated, and when at the other end of its path they are locked against operation.

37. In a voting machine, the combination of a vote indicator, a register or counter operatively connected therewith, a detent for said vote indicator, a reciprocating bar arranged and adapted to control the operations of the vote indicator and release said detent, a duplex inwardly and outwardly swinging device arranged to control a passage leading to and from the apparatus, and connections between said device and bar whereby the movements of the swinging device lock and unlock the vote indicator.

38. In a voting apparatus, the combination with the operating vote indicators and the registers or counters operatively connected therewith, of the reciprocating bar arranged and adapted to control the vote indicators, two swinging devices rigidly connected together in angular arrangement and adapted to alternately control a passage leading to and from the apparatus and alternately opening and closing said passage by a quarter revolution or less, and connections by said devices and bar for operating the latter, the connections being such that when one swinging device is closed the vote indicators are free to be operated and when the other one is closed the vote indicators are locked.

39. In a voting machine, the combination with a plurality of voting mechanisms, of an exit arm, a resetting mechanism operatively connected with said exit arm to reset and lock said voting mechanism, and an entrance arm operatively connected with said resetting mechanism to unlock said voting mechanisms, said resetting mechanism being operatively connected to both arms.

40. In a voting machine, the combination of voting keys, parts moved by said keys, resetting mechanism, an oscillating part which controls the resetting mechanism and which in normal position is locked, and means under control of the voting official to unlock the reciprocating part before the voter can actuate the voting keys.

41. In a voting machine, a series of individual candidate keys, a series of straight-ticket keys, means to permit the operation of a straight-ticket key and an individual-candidate key at the same time, said means comprising a reciprocating part and a straight-ticket key-part with a projection thereon adapted to impart movement to said reciprocating part.

42. In a voting machine, a series of counters, individual-candidate keys to operate said counters, straight-ticket keys to operate said counters, means operated by said individual-candidate keys to prevent the operation of said counters by any of said straight-ticket keys when operated, a rod coöperating with the said straight-ticket keys to lock said individual-candidate keys.

43. In a voting machine, push bars in rows, each bar having a notch, a locking part for each bar pivoted and movable within such notch, each bar having a shoulder to move the locking part, and having also a shoulder adapted to be engaged by the locking part when the latter is thus moved, and means for disengaging all locking parts left in locking position.

44. In a voting machine, a number of push-bars arranged in a number or rows, a dog for each push-rod, a notched part, a slidable mechanism including a part between each row of dogs and the notched part, and means outside of the machine for actuating said mechanism, whereby the dogs for all the pushrods will be simultaneously disengaged from the notched parts.

45. In a voting machine, push-bars to be actuated by the voter, a dog for each push-bar, a rack or notched part for said dog to engage, and a movable part between the push-bar and the notched part for disengaging the dog from the notched part.

46. In a voting machine, a number of push-bars arranged in a number of rows, a dog for each push-bar, a notched part for the dog to engage, a slidable part including a part between each row of push-bars, and dogs for disengaging the dogs, and means for returning each push-bar to its unoperated position when said sliding part is operated.

47. In a voting machine, a number of push-bars arranged in a number of rows, a dog for each push-bar, a notched part for the dogs to engage, a slidable part including a part between each row of push-bars and the dogs, and means for returning said slidable part to its normal position 48. In a voting machine, the combination with a group of candidate-indicating devices, and a coincident group of register wheels, of a series of reciprocating push-bars, each having opposing parts engaging and actuating said register wheels in their forward and return movements, the movement of the push-bars being parallel to the axis of the register wheels, and a push or key for imparting a forward reciprocation to said push-bars, and means for imparting a return reciprocation thereto, substantially as described.

49. In a voting machine, a sliding push-bar having a notch in it and a locking part movable in the arc of a circle and adapted when operated to engage the notch in the push-bar, substantially as set forth.

50. In a voting machine, the combination of a casing, voting pushes or keys operating through said casing, a movable series of parts, a door or arm having a hinge-rod and an arm rigidly attached thereto, a lever connected to the movable series of parts, and to suitable supports, a bar connecting said lever, and a bar connecting the arm of the hinge-rod to the connecting bar of the lever, substantially as set forth.

51. In a voting machine, the combination of a row of voting keys, a series of movable parts parallel and coextensive with said row, and having parallel slats or bars, means for retracting the same, a device moved by each key engaging one of the bars to move the parts, means for limiting the angle of movement, means for preventing a rearward movement of the parts, and a device for simultaneously releasing the parts and resetting all actuated keys.

52. In a voting machine, a key, a push-bar therefor comprising register-operating means, a register to be operated by said means, a push-bar-locking-dog, operated by its own push-bar to lock such bar, and means independent of the key for returning the dog after it has been operated.

53. In a voting machine, a face plate, a key for each candidate extending through said face plate, a locking mechanism actuated by means of said key, and a resetting bar adapted to engage said locking mechanism after it has been actuated and return it to normal, said key locking mechanism and resetting bar all movable in parallel planes.

54. In a voting machine, the combination with a series of voting keys, of a push or slide bar connected to each voting key, an interlocking bar pivoted to each slide bar, a device for holding the slide bars against movement, a series of pivoted interlocking devices, stops for limiting the lateral movement of the interlocking devices, and mechanism for releasing the interlocking devices for the push-bars and resetting the same.

55. In a voting machine, the combination with a series of independently movable voting keys, of a movable push-bar for each voting key and movable in a straight line therewith, an interlocking bar pivoted to each push-bar, a series of stop devices between which the interlocking bars work, and which are displaced with the raising and lowering of the interlocking bars carried by the push-bars, and a registering device actuated by each voting key.

56. In a voting machine, the combination with a series of independently movable voting keys, of a registering device actuated by each voting key, a movable push or slide bar moved by said voting key, an interlocking bar pivoted to each push or slide bar, a series of devices between which the interlocking bars work, and which act as stops as the interlocking bars are raised and lowered, and of means for holding the voting keys locked against movement in but one direction when the push or slide bars are in normal position.

57. In a voting machine, the combination with register mechanism, of keys and push-bars adapted when operated to actuate the register mechanism, a locking pawl normally in the path of each push-bar and operated thereby, a locking-pawl-resetting-slide-bar, a movable device operated by the exit of the voter, means controlled by movement of said device operating to move the slide bar to reset locked pawls and to permit depression of the keys.

58. In a voting machine, the combination with register mechanisms arranged in columns, of key bars also in columns and each bar adapted when operated to actuate the corresponding register mechanism, pawls adapted to engage and lock bars moved to voted position, a plurality of slide bars, one for each column, having parts normally in the path of the key bars and in contact with the pawls, a movable device operated by the voter on his exit, and means controlled by the movement of said device for moving the several slide bars simultaneously to reset operated pawls and key bars and to permit operation of the key bars.

59. In a voting machine, the combination with registering mechanisms in columns, of key-bars also in columns, each adapted when operated to actuate the corresponding register mechanism, pawls adapted to engage and lock said bars in operated position, a slide bar for each column operatively connected with the pawls, a movable part operated by the voter on his exit, and a rock shaft controlled by the movement of said movable part and operating to move the several slide bars as a unit to disengage said pawls which have been put in locking position and to permit the key bars to move.

60. In a voting machine, the combination with register mechanism, of key bars adapted when operated to actuate the register mechanism, a movable part operated by the voter on his exit, a rock shaft controlled by the movement of said movable part, and mechanism for limiting the number of key bars to be operated, said mechanism being permitted by the movement of the rock shaft to be actuated by the key bars.

61. In a voting machine, the combination with register mechanism, of key bars adapted when operated to actuate the register mechanism, slide pallets or fingers adapted to be moved by the operation of the key-bars, a rock shaft operated by the voter on his exit, a sliding part controlled by the movement of said rock shaft, and adapted in the movement of the rock shaft to be brought into the path of dogs, and means for limiting the movement of the parts.

62. A voting machine comprising a plurality of series of registers arranged in transverse office and party rows, a correspondingly arranged plurality of series of vote selecting indicators, one indicator for each register, relatively fixed supports for each of said plurality of series of registers and indicators, a structure movable edgewise independently of said supports and having bars corresponding to one series of said rows and operative when moved to actuate said registers, and suitable interlocking mechanism for said indicators.

63. A voting machine comprising a plurality of series of registers arranged in transverse office and party rows, a correspondingly arranged plurality of series of vote selecting indicators, one indicator for each register, relatively fixed supports for each of said plurality of series of registers and indicators, a structure movable edgewise independently of said supports and having bars corresponding to one series of said rows and operative when moved to complete the actuation of said registers and effect the count, and suitable interlocking mechanism for said indicators.

64. A voting machine comprising a plurality of series of registers arranged in transverse office and party rows, a correspondingly arranged plurality of series of vote selecting indicators, one indicator for each register, relatively fixed supports for each of said plurality of series of registers and indicators, a series of bars corresponding to one series of said rows and operative when moved to actuate said registers, said bars being connected to a common operating device and movable edgewise, and suitable interlocking mechanism for said indicators.

65. A voting machine comprising a plurality of series of registers arranged in transverse office and party rows, a correspondingly arranged plurality of series of vote selecting indicators, one indicator for each register, relatively fixed supports for each of said plurality of series of registers and indicators, a structure movable edgewise independently of said supports and having bars corresponding to one series of said rows and operative when moved to actuate said registers, and suitable interlocking mechanism for said indicators.

66. A voting machine comprising a plurality of series of registers arranged in transverse office and party rows, a correspondingly arranged plurality of series of vote selecting indicators, one indicator for each register, relatively fixed supports for each of said plurality of series of registers and indicators, a structure movable edgewise independently of said supports and having bars corresponding to one series of said rows and operative when moved to complete the actuation of said registers and effect a count, and suitable interlocking mechanism for said indicators.

67. A voting machine comprising a plurality of series of registers arranged in transverse office and party rows, a correspondingly arranged plurality of series of vote selecting indicators, one indicator for each register, relatively fixed supports for each of said plurality of series of registers and indicators, a series of bars corresponding to one series of said rows and operative when moved to actuate said registers, said bars being connected and movable edgewise, and suitable interlocking mechanism for said indicators.

CHARLES HERBERT OCUMPAUGH.

Witnesses:
R. F. OSGOOD,
C. G. CRANNELL.